United States Patent
Wodrich

(10) Patent No.: US 11,294,049 B2
(45) Date of Patent: *Apr. 5, 2022

(54) MOUNTING SYSTEM FOR VEHICULAR SENSORS

(71) Applicant: MAGNA ELECTRONICS INC., Auburn Hills, MI (US)

(72) Inventor: Helmut A. Wodrich, Clarkston, MI (US)

(73) Assignee: MAGNA ELECTRONICS INC., Auburn Hills, MI (US)

(*) Notice: Subject to any disclaimer, the term of this patent is extended or adjusted under 35 U.S.C. 154(b) by 144 days.

This patent is subject to a terminal disclaimer.

(21) Appl. No.: 16/740,621

(22) Filed: Jan. 13, 2020

(65) Prior Publication Data

US 2020/0150267 A1 May 14, 2020

Related U.S. Application Data

(63) Continuation of application No. 15/584,265, filed on May 2, 2017, now Pat. No. 10,534,081.

(Continued)

(51) Int. Cl.
*G01S 13/931* (2020.01)
*G01S 13/87* (2006.01)
(Continued)

(52) U.S. Cl.
CPC ............ *G01S 13/931* (2013.01); *G01S 13/87* (2013.01); *B60W 2420/52* (2013.01);
(Continued)

(58) Field of Classification Search
CPC ................ G01S 13/931; G01S 13/867; G01S 2013/93271; G01S 13/87;
(Continued)

(56) References Cited

U.S. PATENT DOCUMENTS 5,326,133 A 7/1994 Breed et al.
5,949,331 A 9/1999 Schofield et al.
(Continued)

FOREIGN PATENT DOCUMENTS

GB 2400352 A * 10/2004 .............. B60R 21/38
WO WO-2009103692 A1 * 8/2009 .............. G08G 1/167
WO 2011090484 A1 7/2011

*Primary Examiner* — Olumide Ajibade Akonai
(74) *Attorney, Agent, or Firm* — Honigman LLP

(57) ABSTRACT

A vehicular sensing system includes a control and a mounting carrier that is configured to support a plurality of sensor units at a vehicle so that the plurality of sensor units have respective fields of sensing exterior of the vehicle. The mounting carrier includes an electrical connector that is configured to electrically connect to an electrical connector of the vehicle. The sensor units are electrically connected to the electrical connector of the mounting carrier. The control, responsive to outputs of the sensor units, determines the presence of one or more objects within the field of sensing of at least one of the sensor units, and obtains height data pertaining to the height of the determined object. Responsive at least in part to the obtained height data, the control determines (i) that the determined object comprises a pedestrian, (ii) that the determined object comprises a curb and/or (iii) clearance information.

34 Claims, 6 Drawing Sheets

Related U.S. Application Data

(60) Provisional application No. 62/330,557, filed on May 2, 2016.

(51) Int. Cl.
*H01Q 17/00* (2006.01)
*H01Q 1/32* (2006.01)
*G01S 7/02* (2006.01)

(52) U.S. Cl.
CPC ....... *G01S 7/027* (2021.05); *G01S 2013/9314* (2013.01); *G01S 2013/9315* (2020.01); *G01S 2013/9318* (2020.01); *G01S 2013/9327* (2020.01); *G01S 2013/93185* (2020.01); *G01S 2013/93271* (2020.01); *G01S 2013/93272* (2020.01); *G01S 2013/93275* (2020.01); *H01Q 1/3291* (2013.01); *H01Q 17/00* (2013.01)

(58) Field of Classification Search
CPC ... G01S 2013/93272; G01S 2013/9321; G01S 2013/9318; G01S 2013/9315; G01S 2013/93275; G01S 2013/9327; B60W 2420/52; B60R 21/0134; B60R 21/34; B60R 19/483; G06K 9/00805; G06K 9/00791; G06K 9/3241; G06K 9/00369; G06T 2207/30261
See application file for complete search history.

(56) References Cited

U.S. PATENT DOCUMENTS

| | | |
|---|---|---|
| 6,496,138 B1 | 12/2002 | Honma |
| 6,508,325 B1 | 1/2003 | Schwarz et al. |
| 6,587,186 B2 | 7/2003 | Bamji et al. |
| 6,674,895 B2 | 1/2004 | Rafii et al. |
| 6,678,039 B2 | 1/2004 | Charbon |
| 6,690,354 B2 | 2/2004 | Sze |
| 6,710,770 B2 | 3/2004 | Tomasi et al. |
| 6,729,429 B2 | 5/2004 | Takahashi |
| 6,825,455 B1 | 11/2004 | Schwarte |
| 6,876,775 B2 | 4/2005 | Torunoglu |
| 6,906,793 B2 | 6/2005 | Bamji et al. |
| 6,919,549 B2 | 7/2005 | Bamji et al. |
| 7,053,357 B2 | 5/2006 | Schwarte |
| 7,157,685 B2 | 1/2007 | Bamji et al. |
| 7,176,438 B2 | 2/2007 | Bamji et al. |
| 7,203,356 B2 | 4/2007 | Gokturk et al. |
| 7,212,663 B2 | 5/2007 | Tomasi |
| 7,283,213 B2 | 10/2007 | O'Connor et al. |
| 7,310,431 B2 | 12/2007 | Gokturk et al. |
| 7,321,111 B2 | 1/2008 | Bamji et al. |
| 7,340,077 B2 | 3/2008 | Gokturk et al. |
| 7,352,454 B2 | 4/2008 | Bamji et al. |
| 7,375,803 B1 | 5/2008 | Bamji |
| 7,379,100 B2 | 5/2008 | Gokturk et al. |
| 7,379,163 B2 | 5/2008 | Rafii et al. |
| 7,405,812 B1 | 7/2008 | Bamji |
| 7,408,627 B2 | 8/2008 | Bamji et al. |
| 7,954,866 B2 | 6/2011 | Barcomb et al. |
| 8,013,780 B2 | 9/2011 | Lynam |
| 8,027,029 B2 | 9/2011 | Lu et al. |
| 9,575,160 B1 | 2/2017 | Davis et al. |
| 9,653,796 B2 | 5/2017 | Pleva |
| 9,828,036 B2 | 11/2017 | Frayer et al. |
| 9,849,852 B1 * | 12/2017 | Larner ............... B60R 21/0134 |
| 9,963,085 B2 | 5/2018 | Smith et al. |
| 10,534,081 B2 | 1/2020 | Wodrich |
| 2002/0067305 A1 | 6/2002 | LeBlanc et al. |
| 2003/0184471 A1 * | 10/2003 | Tohyama ............... H01Q 1/125 342/175 |
| 2008/0122682 A1 * | 5/2008 | Sanada ................ G01S 7/4026 342/147 |
| 2010/0245066 A1 | 9/2010 | Sarioglu et al. |
| 2012/0169526 A1 | 7/2012 | Reilhac |
| 2014/0111370 A1 | 4/2014 | Aleem et al. |
| 2017/0222311 A1 | 8/2017 | Hess et al. |
| 2017/0254873 A1 | 9/2017 | Koravadi |
| 2017/0276788 A1 | 9/2017 | Wodrich |

* cited by examiner picoRAD Sensor Ass'y

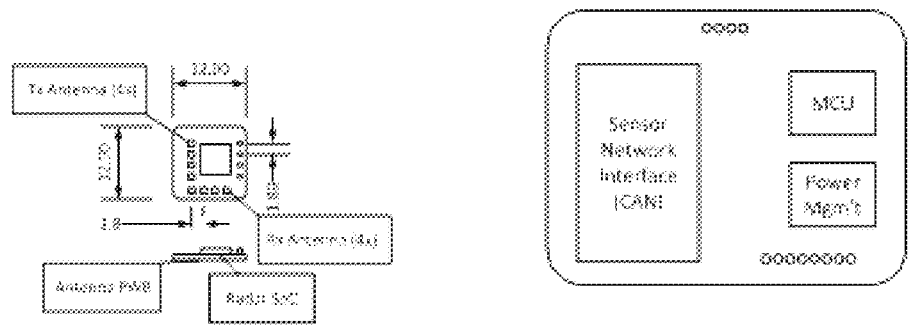
FIG. 7
FIG. 8
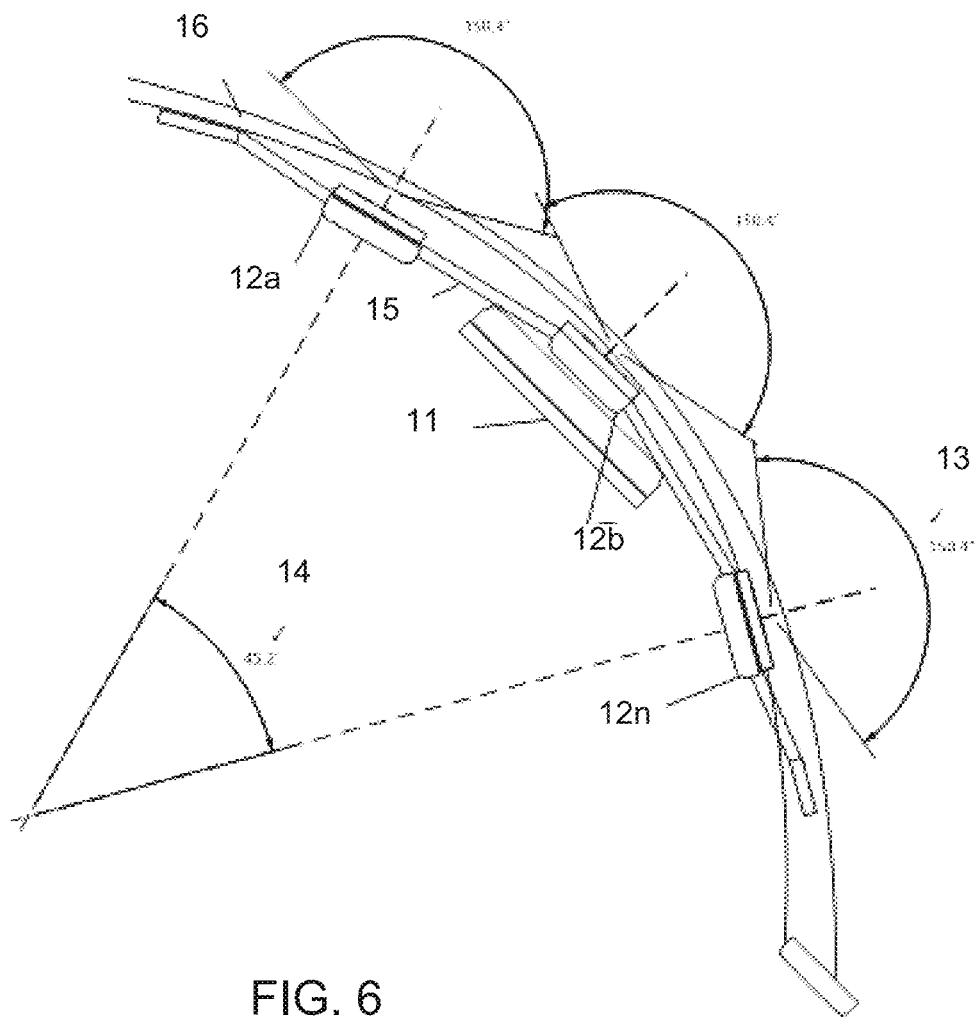
FIG. 6

MOUNTING SYSTEM FOR VEHICULAR SENSORS

CROSS REFERENCE TO RELATED APPLICATIONS

The present application is a continuation of U.S. patent application Ser. No. 15/584,265, filed May 2, 2017, now U.S. Pat. No. 10,534,081, which claims the filing benefits of U.S. provisional application Ser. No. 62/330,557, filed May 2, 2016, which is hereby incorporated herein by reference in its entirety.

FIELD OF THE INVENTION

The present invention relates generally to a vehicle sensing system for a vehicle and, more particularly, to a vehicle sensing system that utilizes one or more sensors at a vehicle to provide a field of sensing around the vehicle.

BACKGROUND OF THE INVENTION

Use of imaging sensors or ultrasonic sensors or radar sensors in vehicle sensing systems is common and known. Examples of such known systems are described in U.S. Pat. Nos. 8,013,780 and 5,949,331 and/or U.S. publication No. US-2010-0245066 and/or International Publication No. WO 2011/090484, which are hereby incorporated herein by reference in their entireties.

Current radar sensors for vehicle corner applications are typically limited in their functionality, based on the design of the device and the location on the vehicle. There are typically narrow constraints on the physical location, relative the direction of travel of the vehicle, under which the software for the systems function and the antenna configuration are able to fulfill the functional requirements of applications. These constraints limit the number of functions and applications that a specific radar sensor can be used for in automatic driver assistance system (ADAS) applications. This has resulted in radars designed specifically for a given application.

The design of electrical circuits within housings using over molding and insert molding technics is common practice for switches and other electrical devices (see FIG. 1). Such designs permit electrical connections to be made, while insulating circuits within the device.

SUMMARY OF THE INVENTION

The present invention provides a driver assistance system or sensing system for a vehicle that utilizes one or more short range ranging sensors (such as RADAR sensors or the like) disposed at the vehicle to sense respective regions exterior of the vehicle, with the sensors or sensor units comprising According to an aspect of the present invention, individual sensors are positioned in a carrier bracket to provide an expanded field of sensing or Field of View (FOV) for the array of sensors greater than the individual sensors. The resulting FOV is then the FOV of the individual sensor plus the Horizontal Included Angle (HIA) between sensors. It is envisioned that in placing sensors around the rear or front corners of the bumper/fascia, a FOV greater than 180 degrees could be achieved. In addition, by placing the individual sensors at different heights within the carrier bracket, the sensing system may obtain height data (such as height of objects), that could be relevant for pedestrian detection and object classification, curb detection, clearance information and/or the like. This capability could be further enhanced by placing the sensors with a Vertical Included Angle (VIA).

The carrier bracket of the present invention permits the use of standard sensing devices to be easily customized for vehicle design attributes (corner profiles, fascia shape, styling aspects, etc.). By maintaining a standard sensor capable of use for a variety of applications and in various configurations, the speed of development is accelerated. The carrier bracket is designed to provide the necessary accuracy and repeatability of position required to support the function. It is envisioned that the carrier bracket could include integrate electrical circuits and connections for the sensors to the carrier bracket and from the carrier bracket to the vehicle harness, thereby saving space and cost. In low volume applications, the connection of the sensors may be realized with wiring harness or pigtails integrated to the carrier bracket.

These and other objects, advantages, purposes and features of the present invention will become apparent upon review of the following specification in conjunction with the drawings.

BRIEF DESCRIPTION OF THE DRAWINGS

FIG. 6 is a top view of a vehicle bumper/fascia with integrated antenna PWB assemblies within an insert molded mounting system for multiple short range sensors in accordance with the present invention;

FIG. 7 is a plan view of an integrated antenna PWB assembly suitable for use with the mounting system shown in FIG. 6;

FIG. 8 is a plan view of an integrated circuit PWB of processing of radar data, suitable for use with the mounting system shown in FIG. 6.

DESCRIPTION OF THE PREFERRED EMBODIMENTS

Figure 1:
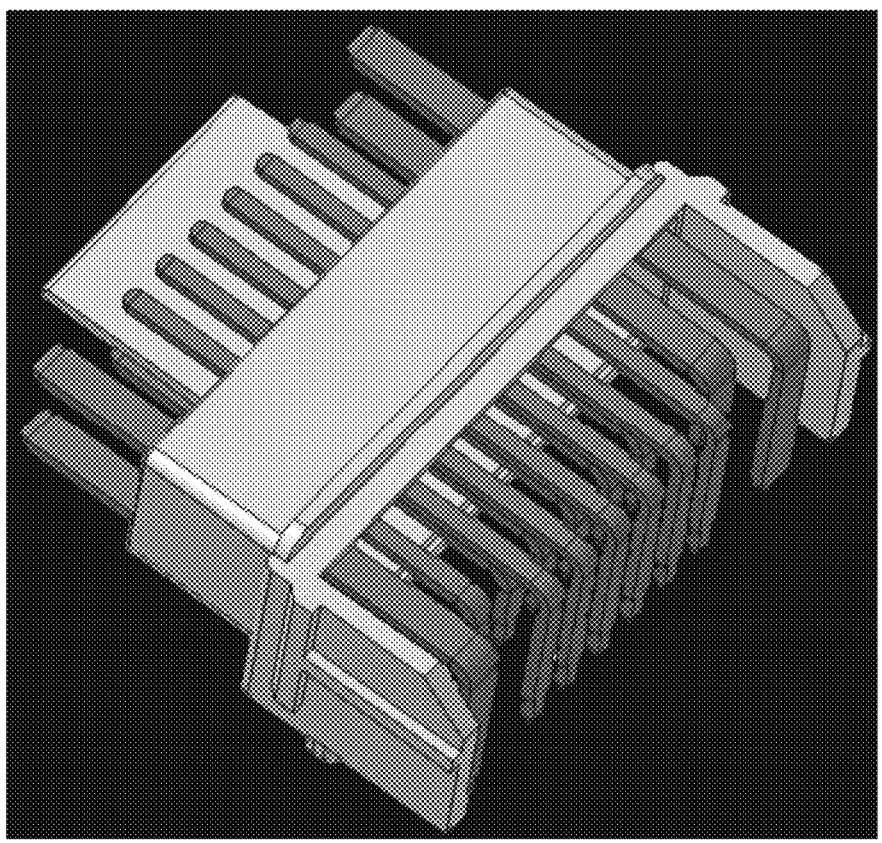
FIG. 1 is a perspective view of an insert molded electrical connector for a known sensing system.

A vehicle sensing system and/or driver assist system and/or object detection system and/or alert system operates to capture sensing data exterior of the vehicle and may process the captured data to detect objects at or near the vehicle and in the predicted path of the vehicle, such as to assist a driver of the vehicle in maneuvering the vehicle in a forward or rearward direction or to assist the driver in parking the vehicle in a parking space. The system includes a processor that is operable to receive sensing data from multiple sensors and provide an output to a control that, responsive to the output, generates an alert or controls an accessory or system of the vehicle, or highlights or overlays an alert on a display screen (that may be displaying video images captured by a rearward viewing camera of the vehicle during a reversing maneuver of the vehicle).

Sensors are often disposed at the vehicle exterior for sensing exterior of the vehicle. Vehicle manufacturers employ techniques such as painting, black color matching within the front grill of the vehicle and placement into rear lights (red) to improve styling aesthetics. Ultrasonic systems may be capable of transmission through the plastic fascia to eliminate the visible cues deemed undesired by vehicle styling groups. Vehicle manufacturers continue to be interested in technologies that could eliminate visible sensors, yet provide equal function for a similar cost. The present invention provides a mounting system for short ranges sensors that provides enhanced and uniform mounting at a vehicle bumper/fascia, as discussed below.

The sensors used with the mounting system of the present invention may utilize aspects of the sensors described in U.S. patent application Ser. No. 15/467,247, filed Mar. 23, 2017 and published Sep. 28, 2017 as U.S. Publication No. US-2017-0276788, which is hereby incorporated herein by reference in its entirety. The vehicle sensing system utilizes one or more sensors to provide a field of view around a vehicle. In the applications envisioned in U.S. patent application Ser. No. 15/467,247, the sensors are generally distributed around the vehicle. Applications are envisioned where multiple sensors would be positioned at an accurately located position in close proximity to one another. Custom sensors could be realized by combining the sensing elements, but may necessitate RF certification (in multiple countries) for each new configuration and implementation, possibly creating cost and delay in developing and implementing new sensing solutions. In developing custom sensors, these would need to be designed specifically to fit the geometry of the bumper fascia. These RF certifications would be necessary to obtain FCC, ECC and other local authorization prior to sale of the product.

In accordance with the present invention, individual sensors are positioned in a carrier bracket to provide an expanded Field of View (FOV) for the array of sensors greater than the individual sensors. The resulting FOV is then the FOV of the individual sensors plus the Horizontal Included Angle (HIA) between the sensors. It is envisioned that in placing sensors around the rear or front corners of the exterior body portion of the vehicle, such as at the corners of a front bumper/fascia of the vehicle, a FOV greater than 180 degrees may be achieved. In addition, by placing the individual sensors at different heights within the carrier bracket, the sensing system could obtain height data (such as height of objects), that could be relevant for pedestrian detection and object classification, curb detection, clearance information and/or the like. This capability may be further enhanced by placing the sensors with a Vertical Included Angle (VIA).

Figure 2:
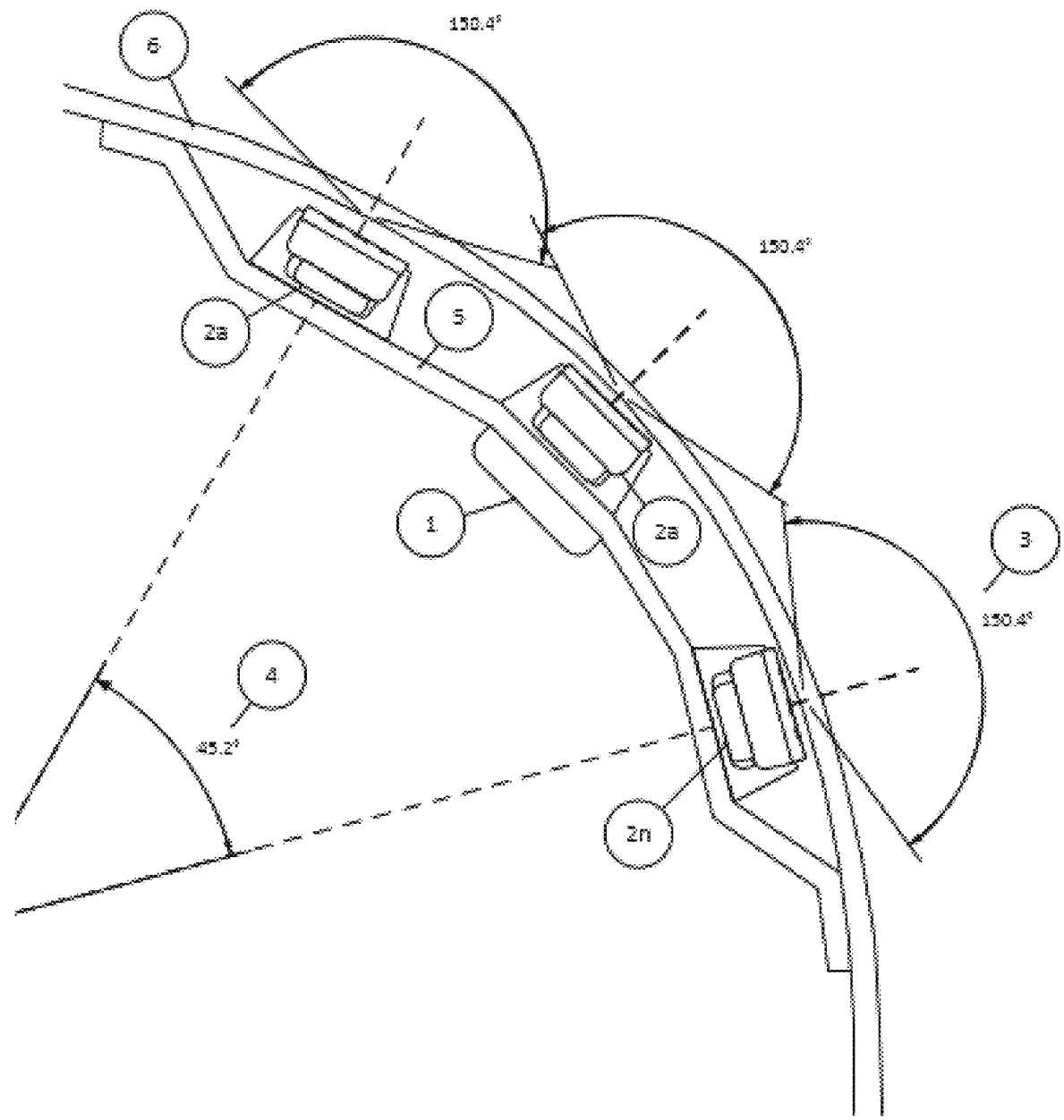
FIG. 2 is a top view of a vehicle bumper/fascia with a mounting system for multiple short range sensors in accordance with the present invention.

Individual sensors may be limited in the Field of View (FOV) available due to the limitations of planar antennas. As shown in FIG. 2, using a carrier bracket 1, multiple sensors 2 may be positioned accurately in an array of "n" sensors to increase the horizontal and/or vertical FOV. In accordance with the present invention, individual sensors with a FOV 3 of about 150 degrees are positioned at the carrier bracket, with a horizontal included angle 4 (HIA) between the sensors at the extreme ends of the bracket. Accordingly, the FOV of any specific array of sensors would be approximately the "Total Average FOV of Sensor+Included Opening Angle." The resulting FOV according to the example is about 195 degrees. It is envisioned that in placing sensors around the rear or front corners of the bumper/fascia, a FOV approaching 240 degrees could be achieved.

Figure 3:
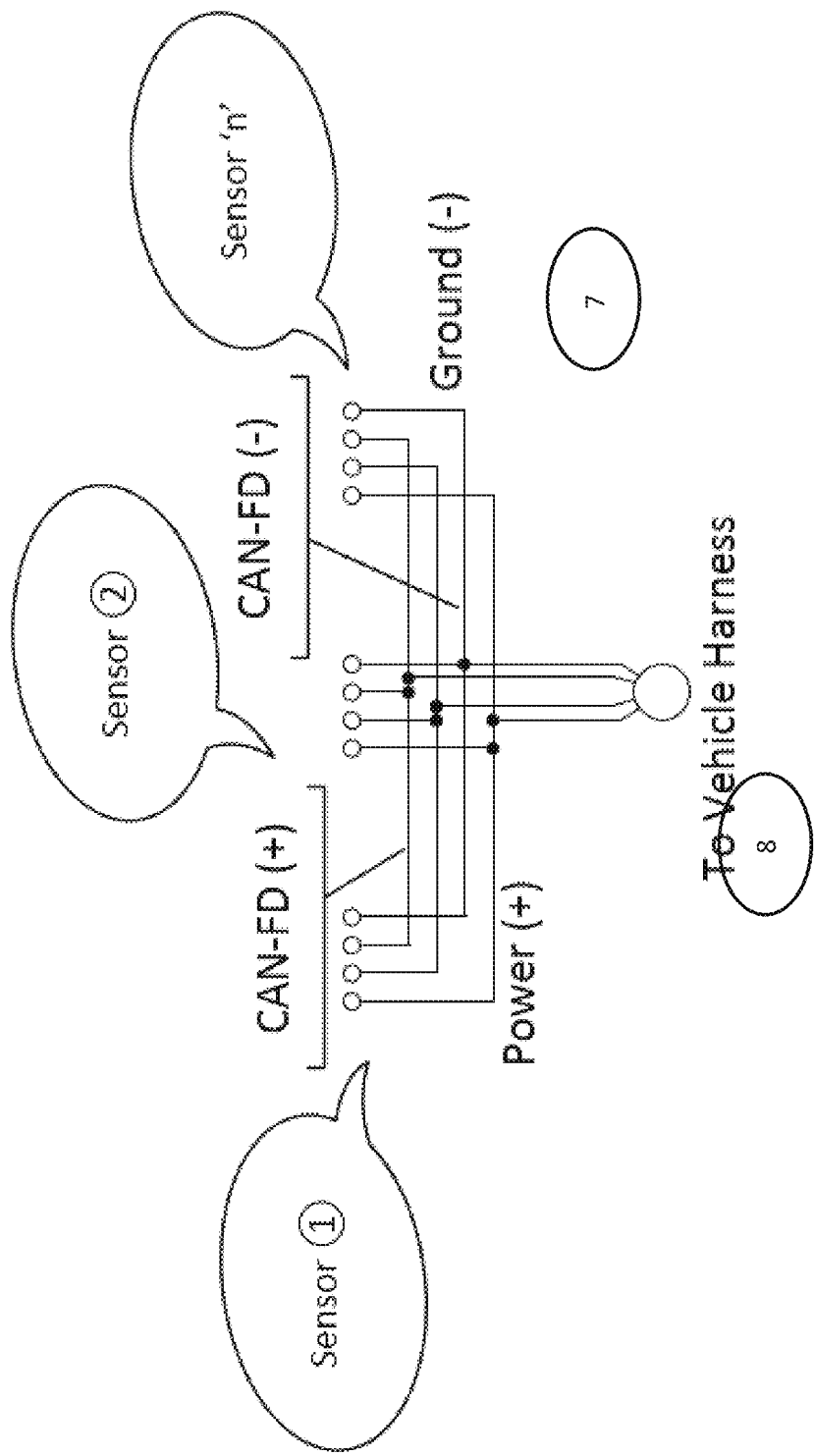
FIG. 3 is a schematic of a circuit that may be insert molded in a carrier bracket of the present invention.

In the application envisioned, the sensors would be connected to a carrier bracket 1 that would provide the following features:
  lead frame for electrical connectivity 7 (FIG. 3);
  connection to permit installation and replacement 8 (FIG. 3);
  positional alignment of each sensor in elevation, separation (distance between sensors), HIA, and VIA; and
  attachment to the bumper/fascia 6.

Figure 4:
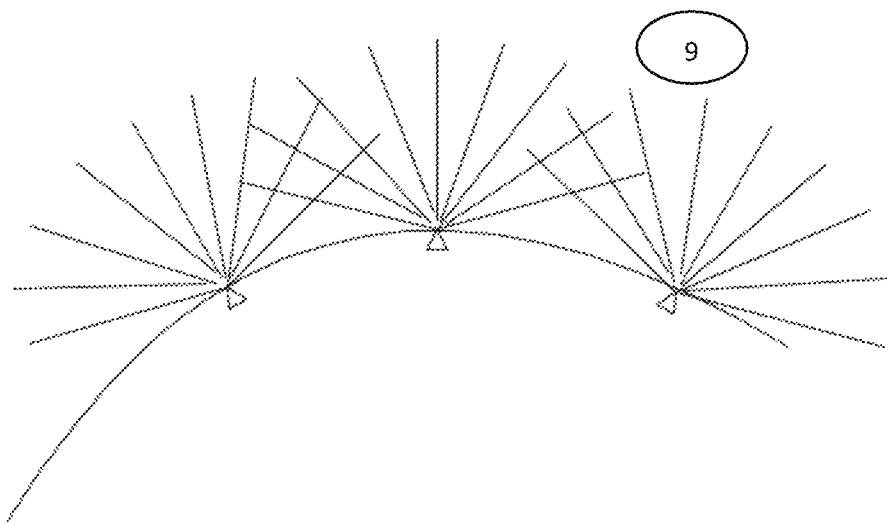
FIG. 4 is a schematic showing multiple sensors at a corner region of a vehicle bumper/fascia with a long baseline Interferometry based on the multiple sensors' interlaced fields of view.
Figure 5:
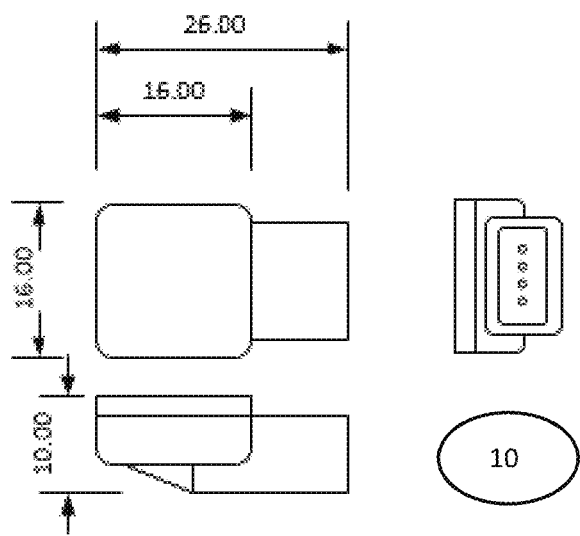
FIG. 5 are views of a standardized short range radar sensor suitable for use with the mounting system of the present invention.

Multiple standardized short range radar sensors 10 (FIG. 5) may be placed at the bracket on a vehicle to provide complete corner coverage for the vehicle. Due to the wider field of view and the ability for radar sensors to detect objects in closer proximity to the bumper fascia, the coverage provided would be greatly improved relative to existing technologies. Through the use of long baseline interferometry and interlacing fields of view 9 (FIG. 4), increased positional accuracy could be realized and point cloud mapping could be used to provide a precise classification of the situation and surrounding objects.

Thus, the present invention provides a carrier bracket that provides for the positioning of an array of radar sensors in accurate location relative to one another. The carrier bracket is attached at a bumper/fascia of a vehicle, such as by using ultrasonic, adhesive, thermal bonding or other similar means to position the bracket on the vehicle. The carrier bracket includes integrated electrical connections and circuits to support an array of sensors, with the circuits and electrical connections integrated in the carrier bracket such as by using an insert molding process. The electrical connection of the sensors may be achieved with a wiring harness of the vehicle electrically connecting to an integrated electrical connector (and circuitry) of the carrier bracket.

The present invention also allows for mounting of an array of sensors, which may be arranged or positioned to provide a horizontal FOV greater than the horizontal FOV of the individual sensors. The array of sensors are positioned to provide a vertical FOV greater than the vertical FOV of the individual sensors. Optionally, the sensing system may comprise sensor arrays connected to a center ECU that is capable of process detection of individual sensors, combining detections within the antenna patterns of horizontal interlaced sensor FOV's to provide an improved positional accuracy. Optionally, the sensing system may comprise sensor arrays connected to the center ECU that is capable of process detection of individual sensors, combining detections within the antenna patterns of vertical interlaced sensor FOV's to provide an improved positional object height measurement and three dimensional (3D) imaging.

The sensing system (mounted at a vehicle via the mounting system of the present invention) is thus capable of providing short range function ADAS functions without sensing components visible on the external surfaces of the vehicle. The system mounts or deploys two or more RF based sensors to provide 360 degrees coverage around a vehicle, and connected using a high bandwidth communication protocol or proprietary network communication protocol. The sensing system supports either sequential transmission or simultaneous transmission of all sensors or groups of sensors providing coverage within the FOV. The sensing system thus deploys two or more RF based sensors to collaboratively provide short range detection for functions such as automated parking, blind spot detection, cross traffic alert, lane change and merge aid, automatic emergency braking, pedestrian detection, turn assist, intersection collision mitigation, and/or the like.

Therefore, the present invention provides a carrier bracket that permits the use of multiple sensing devices, and that can be easily customized for vehicle design attributes (corner profiles, fascia shape, styling aspects). By maintaining a standard sensor capable of use for a variety of applications and in various configurations, the speed of development is accelerated. The carrier bracket is designed to provide the necessary accuracy and repeatability of position required to support the function. It is envisioned that the carrier bracket could include integrate electrical circuits and connections for the sensors to the carrier bracket and from the carrier bracket to the vehicle harness, thereby saving space and cost. In low volume applications, the connection of the sensors may be realized with wiring harness or pigtails integrated to the carrier bracket.

Optionally, instead of complete sensors, the system may include antenna boards (FIG. 7) installed directly into the insert molded bracket, providing both the housing and the interconnecting element. Additionally, the system may include localized ECU processing for either base consolidation of the raw data into object lists or full feature processing. For example, and such as shown in FIG. 7, individual antenna PWB (printed wiring board) assemblies are positioned in a carrier bracket to provide an expanded field of view (FOV) for the array of antenna greater than the individual antenna. The resulting FOV is then the FOV of the individual antennas plus the Horizontal Included Angle (HIA) between the antennas. It is envisioned that in placing antennas around the rear or front corners of the bumper/fascia, a FOV greater than 180 degrees may be achieved. In addition, by placing the individual antennas at different heights within the carrier bracket, the sensing system could obtain height data (such as height of objects), that could be relevant for pedestrian detection and object classification, curb detection, clearance information and/or the like. This capability may be further enhanced by placing the antennas with a Vertical Included Angle (VIA).

Individual antennas may be limited in the Field of View (FOV) available due to the limitations of planar antennas. As shown in FIG. 6, using a carrier bracket 15 (that attaches at an exterior body structure 16, such as a bumper or fascia, of the vehicle), multiple sensors or antenna 12a, 12b, 12n may be positioned accurately in an array of "n" sensors to increase the horizontal or vertical FOV. In accordance with the present invention, individual sensors with a FOV 13 of about 150 degrees are positioned at the carrier bracket, with a horizontal included angle 14 (HIA) between the sensors at the extreme ends of the bracket. Accordingly, the FOV of any specific array of sensors would be approximately the "Total Average FOV of Sensor+Included Opening Angle." The resulting FOV according to the example is about 195 degrees. It is envisioned that in placing sensors around the rear or front corners of the bumper/fascia, a FOV approaching 240 degrees could be achieved.

Figure 9:
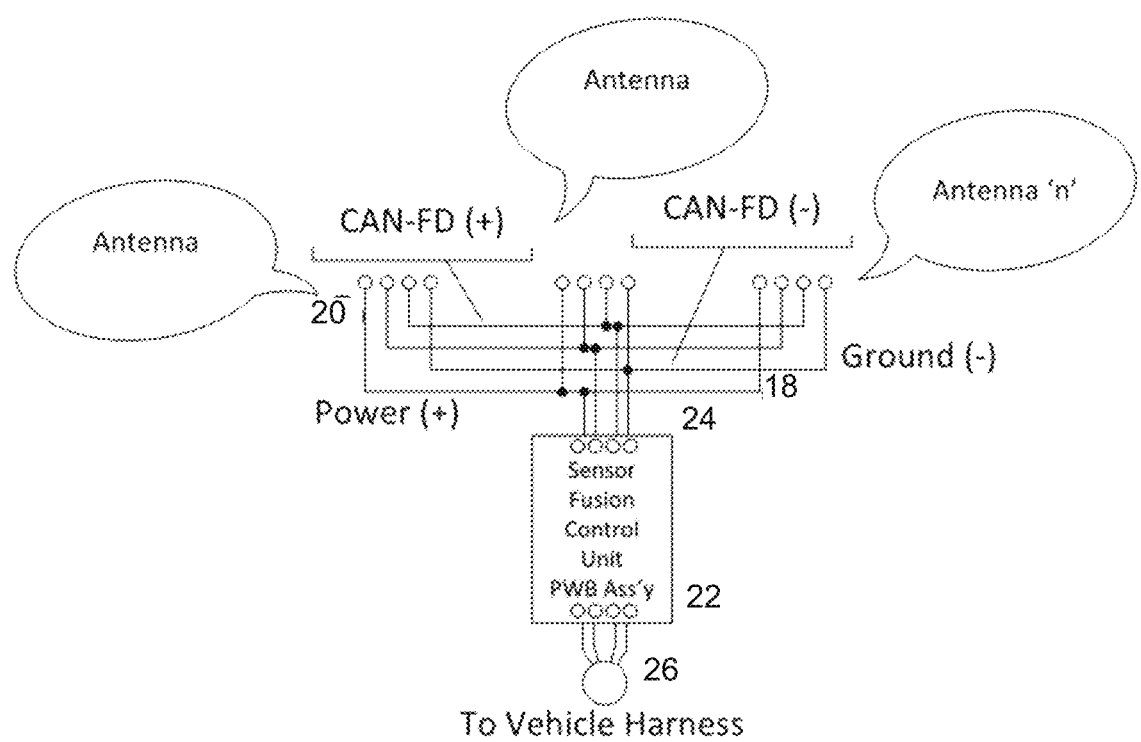
FIG. 9 is a schematic of a circuit that may be insert molded in a carrier bracket of the present invention.

In the illustrated embodiment, the antennas (FIG. 9) would be connected to a carrier bracket 15 (FIG. 6) that would provide the following features:
lead frame for electrical connectivity 18 (FIG. 9);
connection to permit installation 20 (FIG. 9);
positional alignment of each sensor in elevation, separation (distance between sensors), HIA, and VIA;
attachment to the bumper/fascia 16 (FIG. 6); and
connection to permit a sensor fusion control unit 22 (FIG. 8), installation within the bracket 15 at location 11.

Multiple standardized short range radar antennas 12 (FIG. 7) may be placed at the bracket on a vehicle to provide complete corner coverage for the vehicle. Due to the wider field of view and the ability for radar antennas to detect objects in closer proximity to the bumper fascia, the coverage provided would be greatly improved relative to existing technologies. Through the use of long baseline interferometry and interlacing fields of view, increased positional accuracy could be realized and point cloud mapping could be used to provide a precise classification of the situation and surrounding objects.

The carrier thus provides a frame at which the multiple antenna can be attached (or insert molded or otherwise established thereat or therein). The antenna (and/or sensors including transmitters) are electrically connected to a sensor fusion control unit 22 at a connector 24. The sensor fusion control unit 22 of the carrier is configured to be electrically connected to a wiring harness 26 of the vehicle. Thus, the carrier allows for mounting of multiple sensors or antenna in a desired pattern so that the multiple sensors are mounted to the vehicle as a unit or module. The multiple sensors are electrically connected to a common control board, which is electrically connected to a wire harness or electrical connector of the vehicle. The electrical connections between the sensors or antennas and the common board may be made via electrical connectors that are part of the carrier (such as wires attached at and along the carrier frame and/or such as electrically conductive elements that are insert molded in the carrier frame). Thus, the multiple sensors or antennas can be mounted at the vehicle in a desired configuration via a single mounting of the bracket to the vehicle and via a single electrical connection to an electrical connector of the vehicle.

Thus, the present invention provides a carrier bracket that provides for the positioning of an array of radar sensors or an array of antennas in accurate locations relative to one another. The carrier bracket is attached at a bumper/fascia of a vehicle, such as by using ultrasonic, adhesive, thermal bonding or other similar means to position the bracket on the vehicle. The carrier bracket includes integrated electrical connections and circuits to support an array of antennas, with the circuits and electrical connections integrated in the carrier bracket such as by using an insert molding process. The electrical connection of the antennas to a control unit may be achieved with additional circuits integrated in the bracket, wire a wiring harness of the vehicle electrically connecting to the vehicle.

The sensing system may comprise antenna arrays connected to a localized ECU that is capable of process detection of individual antennas, combining detections within the antenna patterns of horizontal interlaced sensor FOVs to provide an improved positional accuracy. Optionally, the sensing system may comprise antenna arrays connected to the localized ECU that is capable of process detection of individual antennas, combining detections within the antenna patterns of vertical interlaced antenna FOVs to provide an improved positional object height measurement and three dimensional (3D) imaging.

The sensing system (mounted at a vehicle via the mounting system of the present invention) is thus capable of providing short range function ADAS functions without sensing components visible on the external surfaces of the vehicle. The system mounts or deploys two or more RF based antennas to provide 360 degrees coverage around a vehicle, and connected using a high bandwidth communication protocol or proprietary network communication protocol. The sensing system supports either sequential transmission or simultaneous transmission of all antenna receivers or groups of receivers providing coverage within the FOV. The sensing system thus deploys two or more RF based antennas to collaboratively provide short range detection for functions such as automated parking, blind spot detection, cross traffic alert, lane change and merge aid, automatic emergency braking, pedestrian detection, turn assist, intersection collision mitigation, and/or the like.

Therefore, the present invention provides a carrier bracket that permits the use of multiple sensing devices, and that can be easily customized for vehicle design attributes (corner profiles, fascia shape, styling aspects). By maintaining a standard antenna capable of use for a variety of applications and in various configurations, the speed of development is accelerated. The carrier bracket is designed to provide the necessary accuracy and repeatability of position required to support the function. It is envisioned that the carrier bracket could include integrate electrical circuits and connections for the sensors to the carrier bracket and from the carrier bracket to the vehicle harness, thereby saving space and cost. In low volume applications, the connection of the sensors may be realized with wiring harness or pigtails integrated to the carrier bracket.

The RF sensing system implemented by the mounting system of the present invention may be part of a sensing system (such as described in U.S. patent application Ser. No. 15/467,247, incorporated above) for a vehicle that utilizes a plurality of RF sensors disposed or arranged at the vehicle to provide a 360 degree field of sensing around the vehicle. The sensing system may include a plurality of RF sensors that are similar in size to existing ultrasonic sensors currently in use for automotive detection, and that are capable of detecting objects in close proximity to the vehicle or other application.

The RF sensors of the sensing system are capable of being located behind RF transmissive material. Thus, the sensing system is operable to provide short range function ADAS functions without sensing components visible on the external surfaces of the vehicle. For example, an RF sensor, capable of short range detection operating as a single transmitting and a single receiving device, can be located behind a vehicle bumper or fascia.

The sensing system of the present invention may utilize aspects of the systems described in U.S. Pat. Nos. 8,013,780 and/or 5,949,331 and/or International Publication No. WO 2011/090484 and/or U.S. Publication No. US-2010-0245066 and/or U.S. patent application Ser. No. 15/446,220, filed Mar. 1, 2017 and published Sep. 7, 2017 as U.S. Publication No. US-2017-0254873, and/or Ser. No. 15/420,238, filed Jan. 31, 2017 and published Aug. 3, 2017 as U.S. Publication No. US-2017-0222311, which are hereby incorporated herein by reference in their entireties.

Changes and modifications in the specifically described embodiments can be carried out without departing from the principles of the invention, which is intended to be limited only by the scope of the appended claims, as interpreted according to the principles of patent law including the doctrine of equivalents.

The invention claimed is:

1. A vehicular sensing system, said vehicular sensing system comprising:
 a mounting carrier that supports a plurality of sensor units;
 wherein said mounting carrier is configured to be mounted at a vehicle so that individual sensor units of said plurality of sensor units have respective fields of sensing exterior of the vehicle, and wherein the mounting carrier comprises a first end and second end;
 wherein a horizontal included angle of the plurality of sensor units is less than 90 degrees, and wherein the horizontal included angle is an angle between a principal axis of sensing of a first sensor unit of the plurality of sensor units that is nearest the first end of the mounting carrier and a principal axis of sensing of a second sensor unit of the plurality of sensor units that is nearest the second end of the mounting carrier;
 wherein, with said mounting carrier mounted at a corner of the vehicle, the plurality of sensor units have a combined horizontal field of sensing that is greater than 180 degrees;
 wherein, with said mounting carrier mounted at the vehicle, at least some of the individual sensor units of said plurality of sensor units are supported at different heights;
 wherein said mounting carrier comprises an electrical connector that is configured to electrically connect to an electrical connector of the vehicle when said mounting carrier is mounted at the vehicle;
 wherein the individual sensor units of said plurality of sensor units are electrically connected to said electrical connector of said mounting carrier;
 a control disposed at the vehicle, said control comprising a data processor for processing outputs of the individual sensor units of said plurality of sensor units;
 wherein, with said mounting carrier mounted at the vehicle, outputs of the individual sensor units of said plurality of sensor units are communicated to said control, and wherein said control, via processing at said control of outputs of the individual sensor units of said plurality of sensor units, determines presence of an object exterior the vehicle and within the field of sensing of at least one of the individual sensor units of said plurality of sensor units;
 wherein said control, via processing at said control of outputs of the individual sensor units of said plurality of sensor units, obtains height data pertaining to height of the object determined to be present exterior the vehicle and within the field of sensing of the at least one of the individual sensor units of said plurality of sensor units; and
 wherein said control, responsive at least in part to the obtained height data, determines at least one selected from the group consisting of (i) that the determined object comprises a pedestrian, (ii) that the determined object comprises a curb and (iii) clearance information.

2. The vehicular sensing system of claim 1, wherein said mounting carrier provides for positioning of the individual sensor units of said plurality of sensor units in accurate locations relative to one another.

3. The vehicular sensing system of claim 1, wherein said mounting carrier is attached to an exterior portion of the vehicle.

4. The vehicular sensing system of claim 3, wherein the exterior portion of the vehicle comprises a bumper of the vehicle.

5. The vehicular sensing system of claim 3, wherein said mounting carrier is attached to the exterior portion of the vehicle using ultrasonic welding, an adhesive or thermal bonding.

6. The vehicular sensing system of claim 1, wherein the individual sensor units of said plurality of sensor units are electrically connected to a common circuit element that is in electrical connection with said electrical connector of said mounting carrier.

7. The vehicular sensing system of claim 6, wherein, with said mounting carrier mounted at the vehicle, outputs of the individual sensor units of said plurality of sensor units are received at said common circuit element and communicated to said control.

8. The vehicular sensing system of claim 7, wherein said mounting carrier includes integrated electrical connectors that electrically connect the individual sensor units of said plurality of sensor units to said common circuit element.

9. The vehicular sensing system of claim 8, wherein said integrated electrical connectors are insert molded in said mounting carrier.

10. The vehicular sensing system of claim 8, wherein said common circuit element is insert molded in said mounting carrier.

11. The vehicular sensing system of claim 1, wherein, with said mounting carrier mounted at the vehicle, the combined horizontal field of sensing of said plurality of sensor units is greater than the horizontal field of sensing of the individual sensor units of said plurality of sensor units.

12. The vehicular sensing system of claim 1, wherein said plurality of sensor units, with said mounting carrier mounted at the vehicle, provide a combined vertical field of sensing greater than the vertical field of sensing of the individual sensor units of said plurality of sensor units.

13. The vehicular sensing system of claim 1, wherein said control comprises an electronic control unit of the vehicle, and wherein said electronic control unit, via processing at said control of outputs of the individual sensor units of said plurality of sensor units, provides an improved positional object height measurement and 3D imaging.

14. The vehicular sensing system of claim 1, wherein said control comprises an electronic control unit of the vehicle, and wherein said electronic control unit, via processing at said control of outputs of the individual sensor units of said plurality of sensor units, provides improved positional accuracy.

15. The vehicular sensing system of claim 1, wherein said vehicular sensing system provides a driver assist system function without sensing components visible on external surfaces of the vehicle.

16. The vehicular sensing system of claim 1, wherein said vehicular sensing system provides 360 degree coverage around the vehicle and uses one selected from the group consisting of (i) a high bandwidth communication protocol and (ii) a proprietary network communication protocol.

17. The vehicular sensing system of claim 16, wherein said vehicular sensing system supports one selected from the group consisting of (i) sequential transmission of outputs of the individual sensor units of said plurality of sensor units and (ii) simultaneous transmission of outputs of the individual sensor units of said plurality of sensor units.

18. The vehicular sensing system of claim 16, wherein said vehicular sensing system provides object detection for at least one of automated parking, blind spot detection, cross traffic alert, lane change and merge aid, automatic emergency braking, pedestrian detection, turn assist, and intersection collision mitigation.

19. The vehicular sensing system of claim 1, wherein said plurality of sensor units comprises a plurality of radar sensor units.

20. A vehicular sensing system, said vehicular sensing system comprising:

a mounting carrier that supports a plurality of radar sensor units;

wherein said mounting carrier is configured to be mounted at a vehicle so that individual radar sensor units of said plurality of radar sensor units have respective fields of sensing exterior of the vehicle, and wherein the mounting carrier comprises a first end and second end;

wherein a horizontal included angle of the plurality of sensor units is less than 90 degrees, and wherein the horizontal included angle is an angle between a principal axis of sensing of a first sensor unit of the plurality of sensor units that is nearest the first end of the mounting carrier and a principal axis of sensing of a second sensor unit of the plurality of sensor units that is nearest the second end of the mounting carrier;

wherein, with said mounting carrier mounted at a corner of the vehicle, the plurality of sensor units have a combined horizontal field of sensing that is greater than 180 degrees;

wherein, with said mounting carrier mounted at the vehicle, the combined horizontal field of sensing of said plurality of radar sensor units is greater than the horizontal field of sensing of the individual radar sensor units of said plurality of radar sensor units;

wherein said plurality of radar sensor units, with said mounting carrier mounted at the vehicle, provide a combined vertical field of sensing greater than the vertical field of sensing of the individual radar sensor units of said plurality of radar sensor units;

wherein, with said mounting carrier mounted at the vehicle, at least some of the individual radar sensor units of said plurality of radar sensor units are supported at different heights;

wherein said mounting carrier comprises an electrical connector that is configured to electrically connect to an electrical connector of the vehicle when said mounting carrier is mounted at the vehicle;

wherein the individual radar sensor units of said plurality of radar sensor units are electrically connected to said electrical connector of said mounting carrier;

an electronic control unit disposed at the vehicle, said electronic control unit comprising a data processor for processing outputs of the individual radar sensor units of said plurality of radar sensor units;

wherein, with said mounting carrier mounted at the vehicle, outputs of the individual radar sensor units of said plurality of radar sensor units are communicated to said electronic control unit, and wherein said electronic control unit, via processing at said electronic control unit of outputs of the individual radar sensor units of said plurality of radar sensor units, determines presence of an object exterior the vehicle and within the field of sensing of at least one of the individual radar sensor units of said plurality of radar sensor units;

wherein said electronic control unit, via processing at said electronic control unit of outputs of the individual radar sensor units of said plurality of radar sensor units, obtains height data pertaining to height of the object determined to be present exterior the vehicle and within the field of sensing of the at least one of the individual radar sensor units of said plurality of radar sensor units; and wherein said electronic control unit, responsive at least in part to the obtained height data, determines at least one selected from the group consisting of (i) that the determined object comprises a pedestrian, (ii) that the determined object comprises a curb and (iii) clearance information.

21. The vehicular sensing system of claim 20, wherein said mounting carrier is attached to an exterior portion of the vehicle, and wherein the exterior portion of the vehicle comprises a bumper of the vehicle.

22. The vehicular sensing system of claim 21, wherein said mounting carrier is attached to the exterior portion of the vehicle using ultrasonic welding, an adhesive or thermal bonding.

23. The vehicular sensing system of claim 20, wherein the individual radar sensor units of said plurality of radar sensor units are electrically connected to a common circuit element that is electrically connected to said electrical connector of said mounting carrier.

24. The vehicular sensing system of claim 23, wherein, with said mounting carrier mounted at the vehicle, outputs of the individual radar sensor units of said plurality of radar sensor units are received at said common circuit element and communicated to said electronic control unit.

25. The vehicular sensing system of claim 24, wherein said mounting carrier includes integrated electrical connectors that electrically connect the individual radar sensor units of said plurality of radar sensor units to said common circuit element.

26. The vehicular sensing system of claim 20, wherein said electronic control unit, via processing at said electronic control unit of outputs of the individual radar sensor units of said plurality of radar sensor units, provides 3D imaging.

27. The vehicular sensing system of claim 20, wherein said vehicular sensing system provides object detection for at least one of automated parking, blind spot detection, cross traffic alert, lane change and merge aid, automatic emergency braking, pedestrian detection, turn assist, and intersection collision mitigation.

28. A vehicular sensing system, said vehicular sensing system comprising:
a mounting carrier that supports a plurality of radar sensor units;
wherein said mounting carrier is configured to be mounted at a vehicle so that individual radar sensor units of said plurality of radar sensor units have respective fields of sensing exterior of the vehicle, and wherein the mounting carrier comprises a first end and second end;
wherein a horizontal included angle of the plurality of sensor units is less than 90 degrees, and wherein the horizontal included angle is an angle between a principal axis of sensing of a first sensor unit of the plurality of sensor units that is nearest the first end of the mounting carrier and a principal axis of sensing of a second sensor unit of the plurality of sensor units that is nearest the second end of the mounting carrier;
wherein, with said mounting carrier mounted at a corner of the vehicle, the plurality of sensor units have a combined horizontal field of sensing that is greater than 180 degrees;
wherein, with said mounting carrier mounted at the vehicle, at least some of the individual radar sensor units of said plurality of radar sensor units are supported at different heights;
wherein said mounting carrier comprises an electrical connector that is configured to electrically connect to an electrical connector of the vehicle when said mounting carrier is mounted at the vehicle;
an electronic control unit disposed at the vehicle, said electronic control unit comprising a data processor for processing outputs of the individual radar sensor units of said plurality of radar sensor units;
wherein, with said mounting carrier mounted at the vehicle, outputs of the individual radar sensor units of said plurality of radar sensor units are communicated to said electronic control unit, and wherein said electronic control unit, via processing at said electronic control unit of outputs of the individual radar sensor units of said plurality of radar sensor units, determines presence of an object exterior the vehicle and within the field of sensing of at least one of the individual radar sensor units of said plurality of radar sensor units;
wherein said electronic control unit, via processing at said electronic control unit of outputs of the individual radar sensor units of said plurality of radar sensor units, obtains height data pertaining to height of the object determined to be present exterior the vehicle and within the field of sensing of the at least one of the individual radar sensor units of said plurality of radar sensor units;
wherein said electronic control unit, responsive at least in part to the obtained height data, determines at least one selected from the group consisting of (i) that the determined object comprises a pedestrian, (ii) that the determined object comprises a curb and (iii) clearance information; and
wherein said vehicular sensing system provides object detection for at least one of automated parking, blind spot detection, cross traffic alert, lane change and merge aid, automatic emergency braking, pedestrian detection, turn assist, and intersection collision mitigation.

29. The vehicular sensing system of claim 28, wherein said mounting carrier is attached to an exterior portion of the vehicle, and wherein the exterior portion of the vehicle comprises a bumper of the vehicle.

30. The vehicular sensing system of claim 28, wherein, with said mounting carrier mounted at the vehicle, outputs of the individual radar sensor units of said plurality of radar sensor units are received at said electrical connector and communicated to said electronic control unit.

31. The vehicular sensing system of claim 30, wherein said mounting carrier includes integrated electrical connectors that electrically connect the individual radar sensor units of said plurality of radar sensor units to a common circuit element that is in electrical connection with said electrical connector of said mounting carrier.

32. The vehicular sensing system of claim 31, wherein said integrated electrical connectors are insert molded in said mounting carrier.

33. The vehicular sensing system of claim 31, wherein said common circuit element is insert molded in said mounting carrier.

34. The vehicular sensing system of claim 31, wherein said electronic control unit, via processing at said electronic control unit of outputs of the individual radar sensor units of said plurality of radar sensor units, provides 3D imaging.

* * * * *